US010072418B2

(12) United States Patent
Mathieson

(10) Patent No.: US 10,072,418 B2
(45) Date of Patent: Sep. 11, 2018

(54) INTEGRAL NAIL/DISK STRUCTURE FOR ELIMINATING EXPOSED ROOF NAILS

(71) Applicant: Thomas R. Mathieson, Louisville, CO (US)

(72) Inventor: Thomas R. Mathieson, Louisville, CO (US)

(*) Notice: Subject to any disclaimer, the term of this patent is extended or adjusted under 35 U.S.C. 154(b) by 0 days.

(21) Appl. No.: 15/872,131

(22) Filed: Jan. 16, 2018

(65) Prior Publication Data

US 2018/0135319 A1   May 17, 2018

Related U.S. Application Data

(60) Continuation-in-part of application No. 15/428,521, filed on Feb. 9, 2017, now abandoned, which is a division of application No. 14/965,559, filed on Dec. 10, 2015, now Pat. No. 9,631,383.

(51) Int. Cl.
| | |
|---|---|
| *E04D 1/34* | (2006.01) |
| *E04D 15/02* | (2006.01) |
| *F16B 15/00* | (2006.01) |
| *E04G 23/02* | (2006.01) |
| *E04D 5/14* | (2006.01) |

(52) U.S. Cl.
CPC ............ *E04D 1/34* (2013.01); *E04D 5/145* (2013.01); *E04D 15/02* (2013.01); *E04G 23/0281* (2013.01); *F16B 15/0092* (2013.01); *E04D 2001/3423* (2013.01); *E04D 2001/3435* (2013.01); *E04D 2001/3491* (2013.01)

(58) Field of Classification Search
CPC ...... F16B 1/0071; F16B 15/0092; E04D 1/34; E04D 2001/3423; E04D 2001/3435; E04D 2001/3491; E04D 5/145

USPC .............. 52/410, 418, 543; 411/13
See application file for complete search history.

(56) References Cited

U.S. PATENT DOCUMENTS

| | | | |
|---|---|---|---|
| 669,315 A | 3/1901 | Whitmore | |
| 742,589 A | 10/1903 | Casler | |
| 846,572 A | 3/1907 | Kunzler | |
| 868,930 A | 10/1907 | Kirk | |
| 948,116 A * | 2/1910 | Pendery | E04D 1/34 |
| | | | 296/135 |
| 1,018,524 A | 2/1912 | Smiley | |

(Continued)

FOREIGN PATENT DOCUMENTS

| | | |
|---|---|---|
| CA | 2484560 C | 5/2005 |
| CN | 204326375 * | 5/2015 |

(Continued)

OTHER PUBLICATIONS 7 page translation of CN 204326375U found on Google Apr. 14, 2018.*

*Primary Examiner* — Robert Canfield
(74) *Attorney, Agent, or Firm* — Husch Blackwell LLP

(57) ABSTRACT

An integral one-piece nail/disk structure which eliminates the need of having any exposed nails associated with a shingled roof, the nail/disk structure including a body member having a roofing nail incorporated or encapsulated therewithin and having color granules associated with at least a portion of the top surface of the body member. The nail/disk structure may include a sealant covering at least a portion of the bottom surface of the body member. The roofing nail is integrally formed with the body member.

12 Claims, 7 Drawing Sheets

(56) References Cited

U.S. PATENT DOCUMENTS

| | | | |
|---|---|---|---|
| 1,410,076 A | 3/1922 | Overbury | |
| 1,583,163 A | 5/1926 | Munro | |
| 1,649,635 A | 11/1927 | Willard | |
| 1,925,774 A | 9/1933 | Phillips | |
| 2,207,897 A | 3/1939 | Schaus | |
| 2,576,262 A | 11/1951 | Morehead | |
| 2,616,377 A * | 11/1952 | Bullard | F16B 15/02 411/459 |
| 2,674,026 A | 4/1954 | St. Palley | |
| 3,049,836 A | 8/1962 | Weissman | |
| 3,230,817 A | 1/1966 | Thomas | |
| 3,468,092 A | 9/1969 | Chalmers | |
| 3,469,490 A | 9/1969 | Pearce | |
| 3,485,134 A | 12/1969 | Ott | |
| 3,750,523 A | 8/1973 | Fujita | |
| 4,010,590 A | 3/1977 | Reinke | |
| 4,074,501 A | 2/1978 | Sandqvist | |
| 4,195,461 A | 4/1980 | Thiis-Evensen | |
| 4,343,215 A | 8/1982 | Fuchs | |
| 4,637,191 A | 1/1987 | Smith | |
| 4,659,604 A | 4/1987 | Lambuth | |
| 4,686,808 A | 8/1987 | Triplett | |
| 4,781,508 A | 11/1988 | Schroeder et al. | |
| 4,787,188 A | 11/1988 | Murphy | |
| 4,788,807 A | 12/1988 | Whitman | |
| 4,875,322 A | 10/1989 | Rozzi | |
| 4,923,348 A | 5/1990 | Carlozzo et al. | |
| 4,982,543 A | 1/1991 | Boyd | |
| 5,195,290 A * | 3/1993 | Hulett | E04D 1/26 52/518 |
| 5,204,148 A | 4/1993 | Alexander et al. | |
| 5,239,802 A * | 8/1993 | Robinson | E04D 1/26 52/518 |
| 5,311,716 A | 5/1994 | Houssin | |
| 5,419,666 A | 5/1995 | Best | |
| 5,669,277 A | 9/1997 | Perrone | |
| 5,778,623 A | 7/1998 | Powell | |
| 5,800,891 A | 9/1998 | Wasitis | |
| 5,916,103 A | 6/1999 | Roberts | |
| 5,946,877 A | 9/1999 | Gallinat et al. | |
| 5,997,229 A | 12/1999 | Akers | |
| 6,095,739 A | 8/2000 | Albertson et al. | |
| 6,148,578 A | 11/2000 | Nowacek et al. | |
| D471,400 S | 3/2003 | Jeter et al. | |
| 6,813,866 B2 * | 11/2004 | Naipawer, III | E04D 1/22 428/141 |
| 7,712,275 B2 | 5/2010 | Kelly | |
| 7,900,266 B1 * | 3/2011 | Longcor, IV | B32B 11/02 D25/139 |
| 8,210,785 B1 | 7/2012 | Gager | |
| 8,763,337 B2 | 7/2014 | Buckwalter et al. | |
| 9,206,835 B2 | 12/2015 | Mathieson | |
| 9,309,911 B1 | 4/2016 | Powell | |
| D764,896 S | 8/2016 | Partridge et al. | |
| 9,631,383 B1 | 4/2017 | Mathieson | |
| 9,695,595 B1 | 7/2017 | Mathieson | |
| 2004/0115022 A1 | 6/2004 | Albertson et al. | |
| 2005/0055961 A1 | 3/2005 | Albertson et al. | |
| 2005/0102922 A1 | 5/2005 | Williams | |
| 2005/0204675 A1 * | 9/2005 | Snyder | B32B 11/02 52/555 |
| 2006/0059825 A1 | 3/2006 | Wiercinski et al. | |
| 2006/0099370 A1 | 5/2006 | Glass | |
| 2007/0199251 A1 | 8/2007 | Sieling et al. | |
| 2007/0199276 A1 | 8/2007 | Duque | |
| 2007/0237600 A1 | 10/2007 | Albertson et al. | |
| 2007/0261337 A1 | 11/2007 | Whitaker et al. | |
| 2008/0155923 A1 | 7/2008 | Teng et al. | |
| 2008/0209835 A1 | 9/2008 | Margarites | |
| 2009/0145944 A1 | 6/2009 | Shor | |
| 2009/0245966 A1 | 10/2009 | Albertson et al. | |
| 2010/0192509 A1 | 8/2010 | Sieling et al. | |
| 2011/0041446 A1 | 2/2011 | Stephens et al. | |
| 2011/0083391 A1 | 4/2011 | Mathieson | |
| 2011/0176885 A1 | 7/2011 | Albertson et al. | |
| 2011/0289879 A1 | 12/2011 | Binkley et al. | |
| 2013/0025224 A1 | 1/2013 | Vermilion et al. | |
| 2014/0334897 A1 * | 11/2014 | Mathieson | E04D 1/34 411/373 |
| 2016/0002914 A1 | 1/2016 | Snyder et al. | |
| 2016/0024794 A1 | 1/2016 | Jenkins et al. | |
| 2017/0167143 A1 | 6/2017 | Mathieson | |
| 2017/0218997 A1 | 8/2017 | Mathieson | |

FOREIGN PATENT DOCUMENTS

| | | | |
|---|---|---|---|
| DE | 19547851 A1 | | 6/1997 |
| EP | 0558459 A1 | | 9/1993 |
| GB | 191111261 A | | 1/1912 |
| GB | 211338 | | 2/1924 |
| JP | 02020754 | | 1/1990 |
| JP | 02-272152 A | | 11/1990 |
| JP | 09151592 A | * | 6/1997 |
| JP | 2001-173623 A | | 6/2001 |
| WO | 8102437 A1 | | 9/1981 |

* cited by examiner

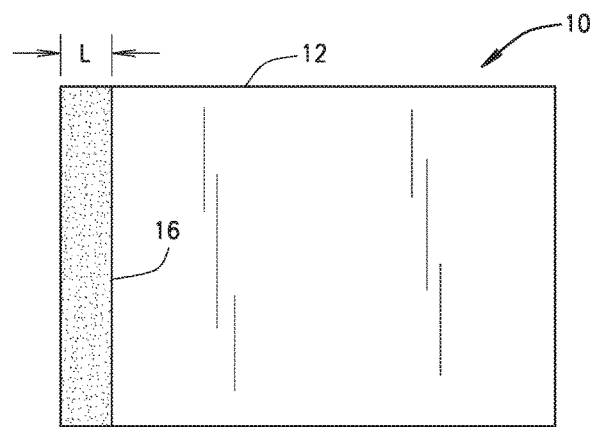
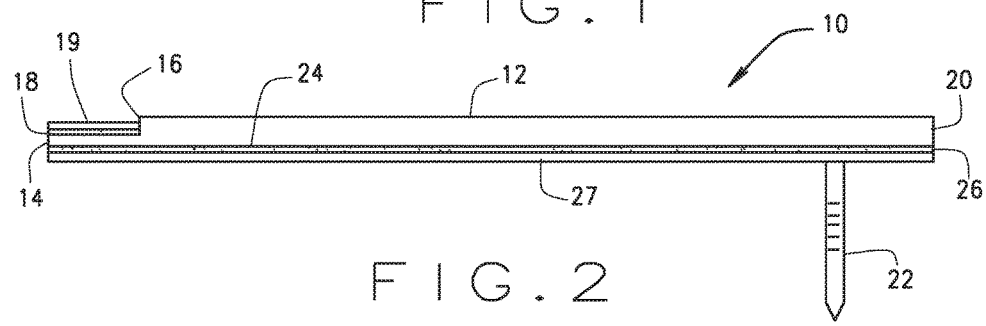
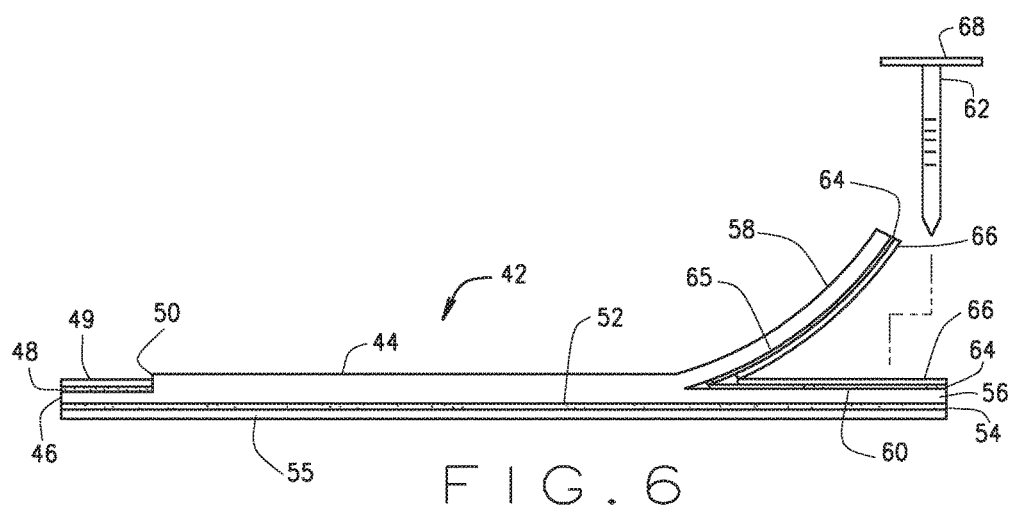

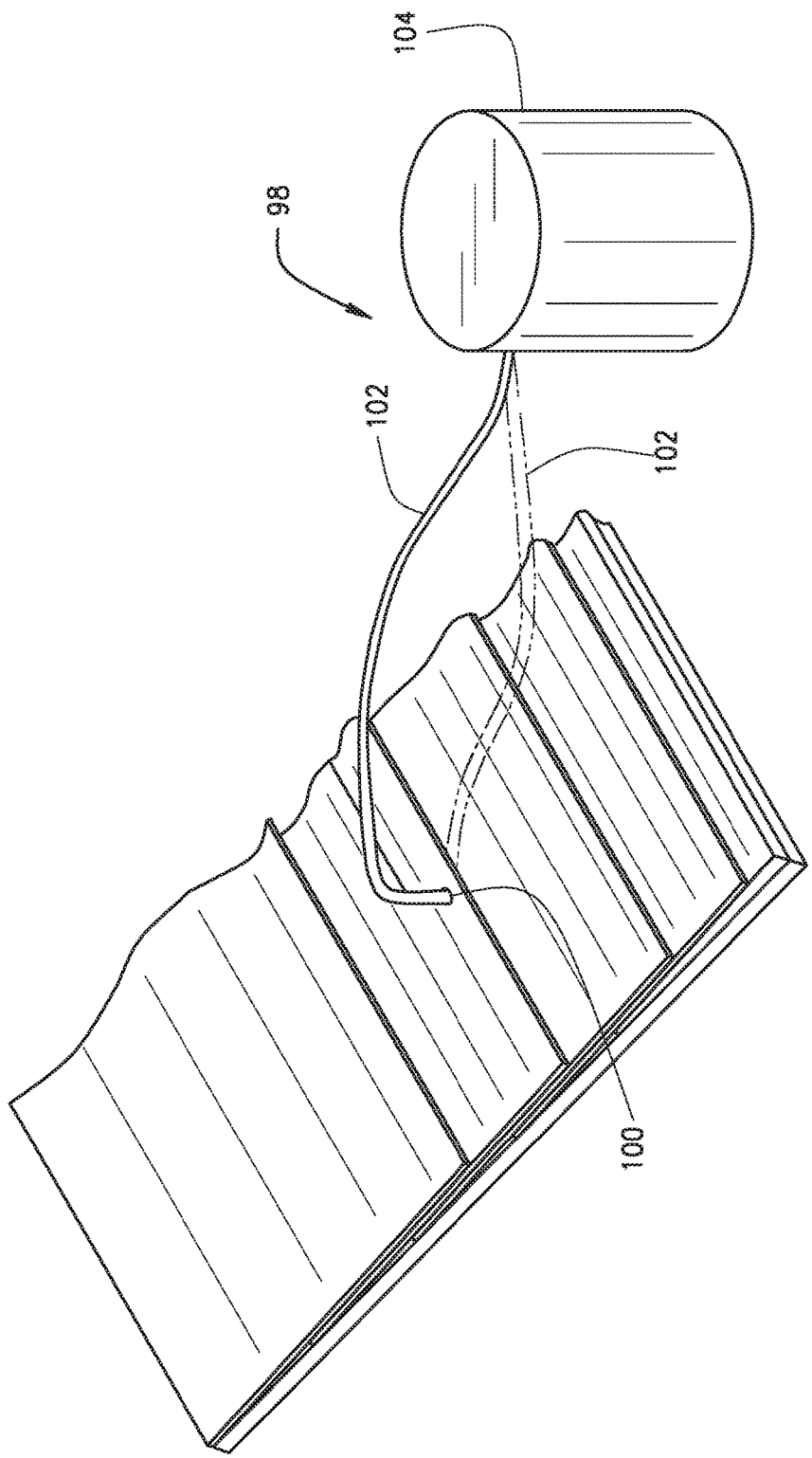

INTEGRAL NAIL/DISK STRUCTURE FOR ELIMINATING EXPOSED ROOF NAILS

CROSS-REFERENCE TO RELATED APPLICATIONS

This application is a continuation-in-part application to U.S. patent application Ser. No. 15/428,521 filed Feb. 9, 2017, which application is a divisional application of U.S. patent application Ser. No. 14/965,559 filed Dec. 10, 2015. The entire disclosures of these applications are hereby incorporated herein by reference.

BACKGROUND OF THE INVENTION

The present invention relates generally to systems and methods for repairing and sealing asphalt shingles and, more particularly, to several embodiments of a shingle patch for repairing hail damage to an asphalt shingle and to an integral nail/disk combination structure for eliminating exposed roof nails when applying new or replacement shingles to a roof structure.

Shingled roofs are typically laid in an overlapping pattern which necessarily requires the roofer to begin laying the shingles at the lowest point of the roof and moving horizontally until one row of shingles is complete. Asphalt shingles are typically nailed to the roof along the uppermost perimeter edge and the horizontal rows progress upwardly with each asphalt shingle slightly overlapping the one below it, thereby covering the nails securing the underlying shingle. With this progression, the shingles are laid in an overlapping specific pattern and it can be seen that at certain positions on the roof, for example, at edges abutting dormers, chimneys, and at the last row of shingles at the apex of the roof, the last course of nails will not be covered by an adjacent shingle and such uncovered nails are therefore exposed to the elements. If left exposed, such uncovered nails will corrode to the point that they may lose their grip or hold on the respective shingles that they are securing to the roof structure.

Shingled roofs are also subject to a wide variety of weather-related damage including hail damage, storm damage, wind damage and the like. In the particular case of hail damage, or any other damage to a particular asphalt shingle, the present methods for replacing damaged shingles are labor-intensive, time consuming and not very cost-effective, particularly, if the damaged shingles are located in the center portion of the roof structure. Current replacement methods typically require a roofer to remove the damaged shingles, which repair also then requires removal or at least lifting and separating surrounding shingles since shingled roofs are laid in an overlapping fashion as explained above. Because replacing individual shingles is time consuming, labor-intensive, and may even cause damage to surrounding shingles, there does exist a need for a better, less labor-intensive, and faster system for repairing damaged asphalt shingles without necessarily removing the damaged shingle.

Still further, since the last course of nails typically associated with an asphalt shingled roof are exposed to the elements, many building codes typically require that this last row of exposed roofing nails be sealed with some type of sealant. Roofers typically attempt to seal the exposed roof nails by using caulking to cover such nails. This is typically messy and an inefficient process. Almost all asphalt shingles come with a 25 or 50-year manufacturer's warranty. Caulking applied to the uncovered nail heads that are exposed to the elements will typically degrade and only last a few years. This breakdown in the caulking or other sealant also exposes the roof/shingle system to premature leaks and other damage thereby mandating that the sealing procedure be repeated to preserve the integrity of the roof structure. In addition, once a tube of caulking is opened, unavoidable exposure of the contents prevents reuse of leftover caulking at another job site. As a result, caulking is wasted and is usually discarded if not entirely used. As a result, there is likewise a need to develop a system for eliminating exposed roof nails, which system would last the life of the new shingles, match the colors of the existing shingles, and save time and money if caulking and other sealants could be eliminated from the roofing process.

In view of the foregoing, it will be apparent to those skilled in the art that a need exists for both a shingle patch for hail damage repair of asphalt shingles as well as an integral nail/disk structure for eliminating exposed roof nails. The present invention addresses both of these needs as well as other needs which will become apparent to those skilled in the art after reading the present disclosure.

SUMMARY OF THE INVENTION

The present invention is directed to several embodiments of a shingle patch and an asphalt emulsion injector system which can be used to repair hail damage and any other shingle damage associated with asphalt shingles as well as to an integrated nail/disk structure which can be used around dormers, chimneys, the last course of nails on a shingled roof, and other places where exposed nail heads would typically exist thereby eliminating any exposed roof nails on any shingled roof.

In one aspect of the present invention, several embodiments of a shingle patch are disclosed wherein the patch can be overlaid on top of a damaged asphalt shingle such as a shingle having hail damage thereby eliminating the need for totally removing the damaged shingle. One embodiment of the present shingle patch includes a patch base member having one end portion of the base member specifically structured for sliding under an existing shingle such as the shingle located immediately above the damaged shingle, whereas the opposite end portion of the present shingle patch base member includes a roof nail built into the patch itself. The top portion of the base member includes colored granules that are embedded into the patch so as to match the color of the existing damaged shingle. In this regard, the present patch can be produced in multiple colors so as to match the known existing asphalt shingle colors in the marketplace, or the patch can be manufactured on site in the field by using a pre-made patch base member as will be hereinafter further explained and thereafter affixing colored granules to the patch base member in the field so as to match the existing colors of the roof to be repaired.

A sealant is associated with the bottom portion of the shingle patch base member and with that portion of the patch base member to be inserted under the existing shingle located above the damaged shingle. This sealant is preferably heat activated and can be factory applied and is typically activated by the sun. A cellophane tape or other material can be placed over the sealant areas so as to prevent the sealant from binding to any other material during shipment and storage. The tape is removed prior to installing the shingle patch over the damaged shingle. In this regard, a technician will lift the bottom edge of the shingle that lies just one row above the damaged shingle, remove the release tape from that portion of the shingle patch that slides under the existing shingle, and then insert that portion of the shingle patch under the raised shingle. The raised shingle is then lowered onto that portion of the shingle patch and that portion of the patch will bind to the existing shingle through the sealant. Once inserted under the existing adjacent shingle, the opposite end portion of the shingle patch housing the integrated roof nail is then nailed to the damaged shingle thereby allowing the under surface of the shingle patch to seal directly to the damaged shingle via the sealant located on the bottom portion of the present patch. Once complete, the present shingle patch will overlay the damaged shingle and will match the color scheme of the roof. Since the damaged shingle remains in place, the present shingle patch provides a double layer of protection over the damaged shingle since the damaged shingle still provides some protection to the roof structure.

In another embodiment of the present shingle patch, the patch base member again includes one end portion that slides under an existing shingle, colored granules embedded in its top surface to match the color scheme of the roof shingle to be repaired, and a sealant covering both that portion of the base member which again slides under the existing shingle as well as covering the bottom surface of the base member. In contrast to the other embodiment of the present shingle patch, this patch embodiment includes a flap portion at its opposite end portion, the flap portion being lifted so that a standard roof nail can be nailed through the corresponding mating surface of the base member into the underlying damaged shingle. In this particular embodiment, an integrated roof nail is not associated with the patch. Instead, the inner surface of the flap portion and its corresponding mating surface are likewise covered with a sealant and both surfaces are likewise covered with a cellophane tape or other release tape to prevent such mating surfaces from bonding together until required. This embodiment of the present patch is again inserted under an existing shingle located immediately above the damaged shingle and once so inserted, the flap portion at the opposite end portion of the base member is lifted, the release tape is removed and a standard roof nail is then nailed through the mating surface of the base member located under the flap portion and through the damaged shingle located below. Once the standard roof nail is hammered into place, the flap portion is lowered such that the flap will cover the head of the standard roof nail just hammered into place. As such, the flap portion serves as a roof nail seal and completely covers the nail head thereby preventing exposure to the elements. The sealant located on the bottom surface of the shingle patch as well as on the mating flap areas and on the area that slides under the existing shingle are all preferably activated either by the sun or by other heat sources thereby bonding the shingle patch to the existing shingle, the damaged shingle and to various portions of the patch itself. Here again, this embodiment of the present shingle patch overlays the damaged shingle and provides an extra layer of protection to the roof structure.

In still another aspect of the present invention, an asphalt emulsion ejector system is also disclosed for repairing a damaged shingle. In this method, a sealant or appropriate emulsion is injected under the damaged shingle so as to cover the area where the damage occurred and to likewise seal the bottom of the damaged shingle to the shingle located therebelow. The upper surface of the damaged shingle is then filled with a liquid emulsion to seal the damaged area located on the top surface of the damaged shingle and color granules are placed in the emulsion to match the granules associated with the damaged shingle. In this method, no specific shingle patch is utilized.

In addition, several tools are disclosed which are specifically designed to raise the bottom edge of the shingle to be lifted so as to create enough space so as to slide the present shingle patch under the raised shingle. One of the disclosed tools also includes a trowel portion with optional saw teeth located along one or both opposed side edge portions thereof for breaking up the sealed asphalt associated with the already installed shingle to be lifted. The trowel portion of this tool can likewise optionally include a heated portion to facilitate the break-up of the seal associated with the shingle to be lifted.

In still another aspect of the present invention, an integral nail/disk structure is disclosed which eliminates the need of having any exposed nails associated with a shingled roof. In this aspect of the present invention, a color matching asphalt shingle disk or other disk material is integrally formed with a nail structure such that both the disk and nail are manufactured together. The body of the disk can take on any shape such as a round shape, a rectangular shape, or a square shape made of hail impact resistant shingle type material or other material which can include a reinforcing layer. A sealant again can optionally cover the underside portion of the disk thereby allowing the disk to permanently seal to the existing shingle when the nail/disk structure is nailed into an existing shingle. The sealant helps to prevent water from entering under the disk. The nail structure itself may include a barbed structure to further improve attachment to the existing shingle.

The present nail/disk structure can be used in all places where an exposed nail head would typically exist on a shingled roof. More specifically, this nail/disk structure would be used as the last course of nails on a typical shingled roof as well as around dormers, chimneys and the like. The present nail/disk structure eliminates the need for caulking or using other sealants to cover exposed nail heads and likewise saves time, money and improves the sealing capacity associated with the last course of nails in a typical shingled roof. The present system and structure will last the life of the new roof shingles; it will match the colors associated with a typical roof and it eliminates exposed nail heads.

The various embodiments of the present shingle patch provide an improved roof repair system for repairing and/or replacing damaged shingles due to severe weather damage such as hail and the like, and the integrated integral nail/disk structure provides a weather-proof roofing nail seal combination that prevents corrosion of nail heads due to exposure to the elements and also provides leak protection and eliminates exposed roofing nails.

These and other specific aspects and advantages of the present embodiments will be apparent to those skilled in the art after reviewing the following detailed description of the illustrative embodiments set forth below which, taken in conjunction with the accompanying drawings, disclose improved structures for the roofing industry.

BRIEF DESCRIPTION OF THE DRAWINGS

FIG. 1 is a top planform view of one embodiment of the present shingle patch constructed in accordance with the teachings of the present invention.

FIG. 2 is a side elevational view of the shingle patch of FIG. 1.

FIG. 6 is a side elevational view of another embodiment of the present shingle patch constructed in accordance with the teachings of the present invention.

FIG. 11 is a representative schematic view illustrating another method for repairing a damaged shingle.

DETAILED DESCRIPTION OF THE INVENTION

Figure 3:
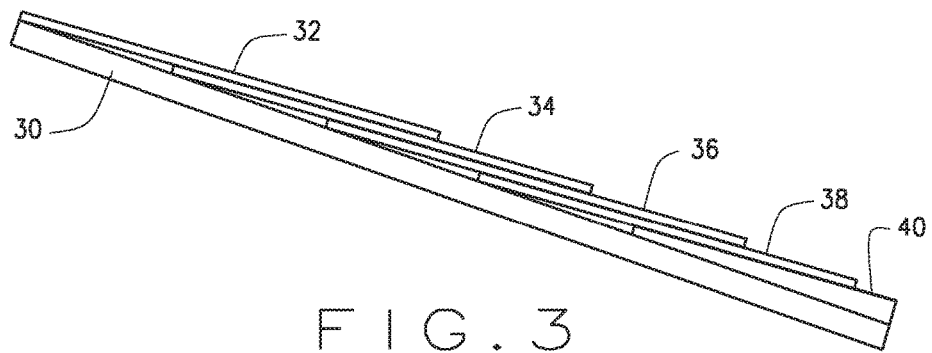
FIG. 3 is a side elevational view of a typical shingled roof showing the overlaying pattern arrangement of shingles before the present shingle patch is applied for repair.

Several embodiments of the present invention will now be explained with reference to the accompanying drawings. It will be apparent to those skilled in the art from this disclosure that the following description of the various embodiments of the present invention is provided for illustration purposes only and not for the purpose of limiting the present invention as defined by the appended claims and their equivalents.

Referring to the drawings more particularly by reference numbers wherein like numbers refer to like parts, the number 10 in FIGS. 1 and 2 refers to one embodiment of a shingle patch used to repair damaged asphalt shingles constructed in accordance with the teachings of the present application. The shingle patch 10 includes a base member 12 sized and shaped similarly to a conventional asphalt shingle or smaller depending upon the particular application, one end portion which includes a notched portion 14 which is specifically shaped and designed for sliding under an existing shingle, such as the shingle located immediately above the damaged shingle, as will be hereinafter further explained. The notched portion 14 of base member 12 includes an overall height or thickness which is less than the overall height or thickness of the remainder of base member 12 as clearly illustrated in FIG. 2. The notched portion 14 is sized so as to be inserted under an existing shingle located immediately above the damaged shingle such that at least a portion of the existing shingle will mate with and rest on top of notched portion 14. Notched portion 14 is thinner than the remainder of base member 12 to likewise avoid creating a hump under the existing shingle when it is overlaid on top of notched portion 14. A wall or ledge portion 16 (FIG. 2) is formed between notched portion 14 and the remainder of base member 12 and functions as a stop or abutment surface for the existing shingle when overlaid on top of notched portion 14 thereby limiting the travel of the existing shingle when the notched portion 14 is inserted under the existing shingle. This arrangement also helps to prevent rain water from infiltrating under the patch 10. The overall length L of notched portion 14 can be varied depending upon the particular application and depending upon the particular size and style of asphalt shingles to be repaired.

The notched portion 14 also includes a sealant and/or adhesive 18 distributed across at least a portion of its upper surface as best illustrated in FIG. 2 for mating with and attaching to the undersurface of the existing shingle when the existing shingle is overlaid on top of notched portion 14. The sealant 18 is preferably a heat activated sealant which can be factory applied and is typically activated by the sun, although other heat sources can be applied to the notched portion 14 to activate the sealant material. Preferably, the sealant 18 covers the entire upper surface of the notched portion 14. A cellophane tape or other release material 19 can be placed over the sealant 18 so as to prevent the sealant from binding to any other material or object during shipment and storage. The tape 19 is removed prior to installing the shingle patch 10 as will be hereinafter further explained.

The opposite end portion 20 of base member 12 includes a roofing nail 22 built into the base member 12. Roofing nail 22 can be any known conventional roofing nail suitable for asphalt shingles. The roofing nail 22 is attached or integrally formed with the shingle patch base member 12 during the manufacturing process or, nail 22 can be otherwise attached to member 12 after the manufacturing process so long as nail 22 and base member 12 form a one-piece unit.

A sealant 26 is likewise associated with at least a portion of the bottom surface 24 of base member 12 as best illustrated in FIG. 2. Similar to sealant 18, sealant 26 is preferably a heat activated sealant and is likewise preferably factory applied and is typically activated by the sun. Here again, sealant 26 preferably covers the entire bottom surface 24 of base member 12. A cellophane tape or other material 27 is likewise placed over sealant 26 so as to again prevent the sealant from binding to any other material or object during shipment and storage. The tape 27 is removed prior to installing the shingle patch 10 over a damaged shingle as will be hereinafter further explained.

The top portion of base member 12 includes colored granules (not shown) that are embedded into the patch material so as to match the color of the existing damaged shingle to be repaired. In this regard, the present shingle patch 10 can be produced in multiple colors so as to match the known existing asphalt shingle colors present in the marketplace, or the base member 12 can be color-coordinated with the shingles to be repaired on-site in the field by using a pre-made shingle base member 12 with no color granules associated therewith and thereafter affixing colored granules to the member 12 in the field so as to match the existing colors of the roof to be repaired. Colored granules can be applied to any portion or the entire top surface of base member 12 in a known conventional manner using appropriate adhesives and/or other sealing materials.

Figure 4:
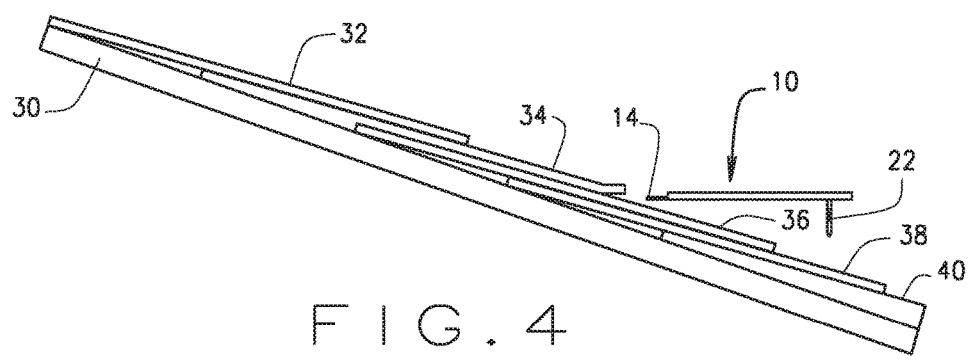
FIG. 4 is a side elevational view similar to FIG. 3 showing the present shingle patch of FIGS. 1 and 2 in exploded view prior to insertion for repair.
Figure 5:
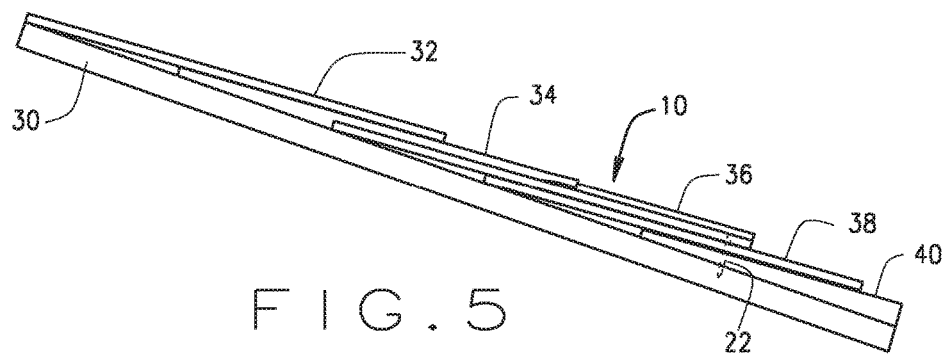
FIG. 5 is a side elevational view similar to FIG. 4 showing the present shingle patch of FIGS. 1 and 2 positioned and attached to the existing roof structure and overlaying the damaged shingle.

FIG. 3 illustrates a typical asphalt shingled roof wherein the underlying roof structure 30 is typically plywood or some other wood product. Typical asphalt shingles 32, 34, 36, 38 and 40 are overlaid in a typical overlapping pattern as illustrated in FIG. 3. Assuming that asphalt shingle 36 is damaged by hail or any other weather event, FIGS. 4 and 5 illustrate the method for repairing damaged asphalt shingle 36 using the present shingle patch 10. Repair will typically begin as illustrated in FIG. 4 where a technician will lift the bottom edge of the shingle that lies immediately above the damaged shingle. As illustrated in FIG. 4, the bottom edge of shingle 34 lies just one row above the damaged shingle 36. Lifting of the bottom edge of shingle 34 can be accomplished with known tools in the trade or with the tools illustrated in FIGS. 9 and 10 as will be hereafter further explained. Once the bottom edge of shingle 34 is lifted as illustrated, the technician will remove the release tape 19 and 27 associated with notched portion 14 and the bottom surface 24 of base member 12 respectively and then slide notched portion 14 of base member 12 under the raised portion of shingle 34. The raised shingle portion of shingle 34 is then lowered onto notched portion 14 and the heat activated or other sealant 18 associated therewith. As stated, prior to inserting notched portion 14 under the raised shingle 34, the release tape 27 associated with the bottom portion 24 of shingle patch 10 is likewise removed prior to installation.

Once notched portion 14 is inserted under the existing adjacent shingle 34, the opposite end portion 20 of base member 12 housing the integrated roofing nail 22 is then nailed to the damaged shingle 36 as best illustrated in FIG. 5. Once nailed, the undersurface of base member 12 is sealed directly to the damaged shingle 36 via the sealant 26 located across its bottom surface. Once completed, the shingle patch 10 will overlay the damaged shingle 36 as illustrated in FIG. 5 and the colored granules associated with the top surface of base member 12 will match the color scheme of the other shingles 32, 34, 36, 38 and 40 associated with the roof structure. The heat activated sealant 18 and 26 will bind to their respective mating surfaces by the heat generated from the sun if a heat activated sealant is used. Other heat sources can be used to immediately activate the sealant 18 and 26 if so desired. This could include using heat blowers, or using a different type of sealant. Since the damaged shingle 36 remains in place, the present shingle patch 10 provides an extra layer of protection since the damaged shingle 36 still provides some protection to the roof structure. Depending upon the size of the damaged area associated with shingle 36, shingle patch 10 can be sized and dimensioned so as to adequately overlay the damaged area of shingle 36. In this regard, shingle patch 10 can merely cover a portion of shingle 36 or, in other embodiments, it can cover substantially all of shingle 36 if so desired. Shingle patch 10 can be made according to any dimensions up to and including covering the entire damaged asphalt shingle.

FIG. 6 illustrates another embodiment 42 of the present shingle patch, namely, shingle patch 42. Patch 42 includes as a base member 44 again having a notched portion 46 associated with one end portion thereof which is constructed substantially similar to notched portion 14 associated with shingle patch 10 including having a sealant 48 covering at least a portion of the upper surface of notched portion 46 and likewise including an abutment surface, ledge or stop portion 50 for positioning and overlaying the existing adjacent shingle which will be positioned on top of notched portion 46 as previously explained. Shingle patch 42 likewise includes colored granules (not shown) embedded into its top surface to match the color scheme of the roof shingles to be repaired, and a sealant 54 covering at least a portion of the bottom surface 52 of base member 44 similar to sealant 26 associated with shingle patch 10.

Shingle patch 42 differs from shingle patch 10 in that it does not include an integrated roofing nail. Instead, the opposite end portion 56 of base member 44 includes a flap portion 58 that can be moved or lifted away from its mating surface 60 as best illustrated in FIG. 6 so that a standard roofing nail 62 can be nailed through the mating surface 60 of base member 44 into the underlying damaged shingle as will be hereinafter explained. The flap portion 58 includes a sealant 64 associated with its inner surface 65 and its mating base portion 60 can likewise optionally include a sealant 64 as well for mating with and sealing with flap portion 58. Both flap surfaces 65 and 60 covered with a sealant 64 are likewise covered with a cellophane tape or other release tape 66 so as to prevent these mating surfaces from bonding together until required. Again, sealant 64 can be a heat activated sealant. Flap portion 58 should be sufficiently large enough so as to allow a roofing technician to hammer a conventional roofing nail through base member mating surface 60 and end portion 56 so as to complete the attachment of shingle patch 42 to the damaged shingle.

Shingle patch 42 is attached overlaying a damaged shingle in a manner substantially similar to shingle patch 10 as illustrated and discussed with respect to FIGS. 3-5. In this regard, the notched portion 46 of shingle patch 42 is again inserted under an existing shingle located immediately above the damaged shingle as discussed above with respect to shingle patch 10. Here again, the release tape 49 covering sealant 48 is removed prior to insertion under the existing shingle. In similar fashion, the release tape 55 associated with sealant 54 is likewise removed prior to insertion of the notched portion 46 under the existing shingle located immediately above the damaged shingle to be repaired. Once the notched portion 46 is properly positioned, shingle patch 42 is lowered and positioned so as to overlay the damaged area of the damaged shingle and the sealant 54 associated with the bottom surface 52 of shingle patch 42 is then allowed to seal directly to the damaged shingle via the sealant 54 as previously explained. At this point, the flap portion 58 is lifted, the release tape 66 associated with both sealant surfaces 64 is removed and a standard roofing nail 62 is then nailed through the mating surface 60 of base member 44 and through the damaged shingle located below. Once the standard roofing nail 62 is hammered into place, the flap portion 58 is lowered and the sealant 64 associated with flap portion 58 and/or mating surface 60 are allowed to bond as previously explained.

Importantly, flap portion 58 covers the head 68 of roofing nail 62 and serves as a seal thereby preventing the roofing nail 62 from being exposed to the elements. Again, the respective heat activated sealants 48, 54 and 64, if used, can all be activated either by the sun or by other heat sources thereby bonding the shingle patch 42 to the existing damaged shingle, the adjacent existing shingle, and the various portions of the mating flap portion 58. Here again, shingle patch 42 overlays the damaged shingle and provides an extra layer of protection to the roof structure. The method of positioning and attaching the shingle patch 42 over a damaged shingle is substantially identical to the procedure outlined with respect to shingle patch 10 as illustrated in FIGS. 3-5 except for using a standard roofing nail 62 as explained above. Like shingle patch 10, shingle patch 42 can be sized and dimensioned as previously explained and depending upon the particular application.

Figure 9:
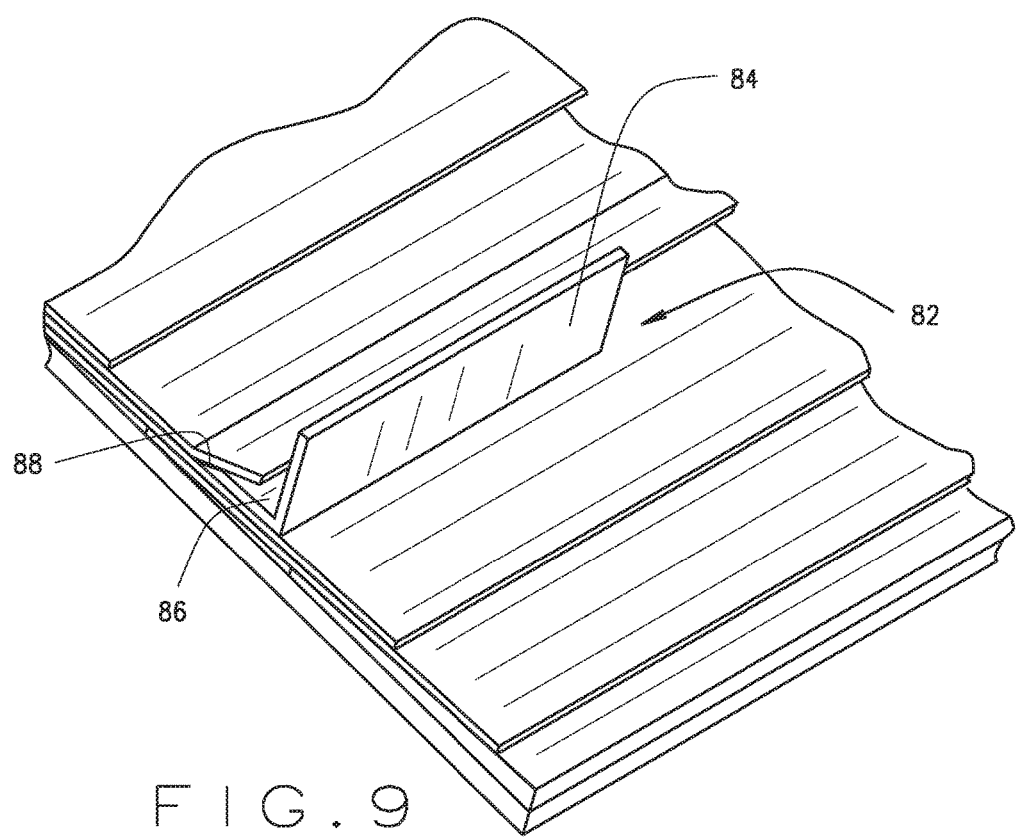
FIG. 9 is a perspective view of one embodiment of a tool that is specifically designed to raise the bottom edge of a shingle to create enough space to slide the present shingle patch thereunder.
Figure 10:
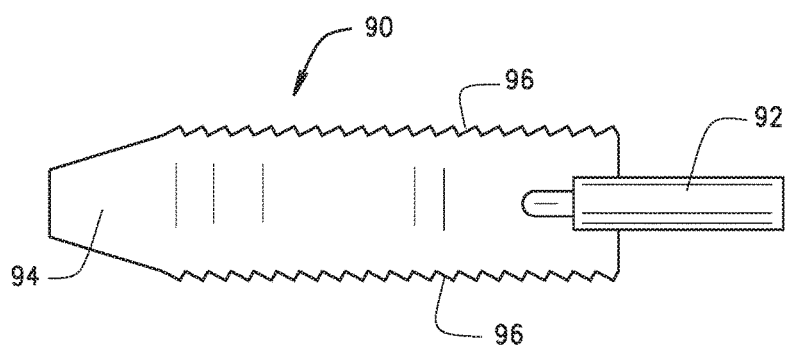
FIG. 10 is a top plan view of another embodiment of a tool for breaking the seal of an already installed asphalt shingle without damaging the shingle, the tool likewise functioning to further lift the bottom edge of a shingle to create space for sliding the present shingle patch thereunder.

FIGS. 9 and 10 disclose tools that can be used to easily lift the bottom edge of a shingle for sliding the notched portion 14 or 46 under the lifted shingle edge portion. Tool 82 illustrated in FIG. 9 is L-shaped in configuration and includes tool portions 84 and 86. Tool portion 86 is used as a wedging member for sliding under the bottom edge portion of a shingle and may include a tapered edge portion 88 to facilitate the insertion process. This tool is specifically designed to raise the bottom edge of the shingle to create enough of a space to slide the shingle patch 10 or 42 under the raised shingle. This is accomplished by lining up tool 82 with the bottom of the shingle edge such that tool portion 86 and tapered portion 88 abut the bottom edge of the shingle. A hammer can be used to hit the tool carefully to force the tool portion 86 under the lap of the shingle. The length or depth of tool portion 86 need only be as long as the overall Length of the notched portion 14 or 46. Once tool portion 86 is positioned under the shingle edge portion, a prying force can be exerted against tool portion 84 to lift the bottom edge of the shingle.

Tool 90 illustrated in FIG. 10 can be used to beak the seal of an already installed asphalt shingle without damaging the shingle. The tool 90 is a trowel shaped tool having a handle 92 and a trowel portion 94. The trowel portion 94 may include saw teeth or a serrated edge portion 96 located along one or both opposed edge portions as illustrated in FIG. 10 to help break up the sealed asphalt as the trowel portion 94 is inserted under the bottom edge of a shingle. In addition, trowel portion 94 may also be heated to further improve and facilitate the break-up of the seal associated with the shingle to be lifted. Heat can be provided to trowel portion 94 in a conventional manner such as the method used in an iron or curling iron. Tool 90 could also be used to life the bottom edge of a shingle to be raised once the seal has been broken or tool 82 could be used after tool 90, if necessary.

FIG. 11 illustrates still another method for repairing a damaged shingle, namely, an asphalt emulsion injection system 98. This method includes injecting a sealant or emulsion/adhesive underneath the damaged shingle and then sealing the top damaged surface of the shingle with an emulsion and applying colored granules into the emulsion to match the color of the damaged shingle. In one aspect of the system 98, a small hole is made in the center of the hale impacted or damaged area of the shingle such as hole 100 illustrated in FIG. 11. A sealant is then injected or pumped under the damaged shingle through the use of a tube 102 and an applicator device 104. The applicator device can be any known device capable of pumping, pushing and/or moving a liquid asphalt emulsion/adhesive or any other appropriate sealant from the device 104 through the tube 102 and through the hole 100 made in the damaged shingle to the area located under the damaged shingle. In this regard, the terminal end of the tube 102 is inserted into the hole 100 such that the sealant pumped therethrough will spread underneath shingle around the area where the damage occurred. The sealant then seals and glues the bottom of the damaged shingle to the shingle located therebelow and seals the space therebetween. The hole and upper face of the damaged shingle is then filled with a liquid emulsion to seal the hole and the upper damaged shingle area and colored granules are then placed in the emulsion to match the granules associated with the damaged shingle. The applicator device can be as simple as a caulking gun where the tube 102 would be the nozzle associated with an adhesive, sealant or emulsion container.

In another aspect of the asphalt emulsion ejector system 98, tube 102 can be manipulated under the damaged shingle by using any one of the tools 82, 90 or any other suitable tool and the liquid emulsion can again be pumped or moved under the damaged shingle and around the damaged area to again seal the bottom of the damaged shingle to the shingle located therebelow. In this aspect of system 98, no hole 100 need be made through the damaged shingle. Once a sealant is pumped under the damaged area, the damaged upper face of the shingle is filled with an emulsion to seal the damaged area and colored granules are again placed in the emulsion to match the granules associated with the damaged shingle. Either method of system 98 will adequately seal and repair the damaged shingle.

Figure 7:
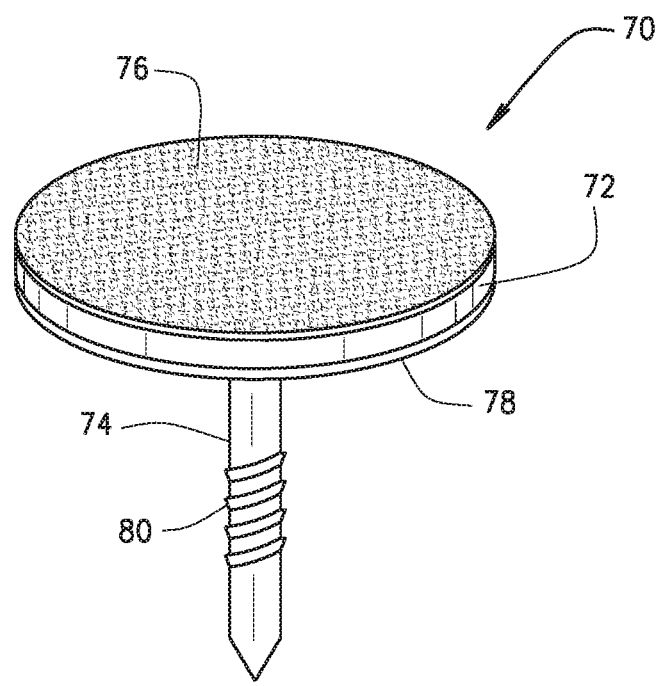
FIG. 7 is a perspective view of another aspect of the present invention illustrating one embodiment of the present nail/disk structure for eliminating exposed nail heads constructed in accordance with the teachings of the present invention.
Figure 8:
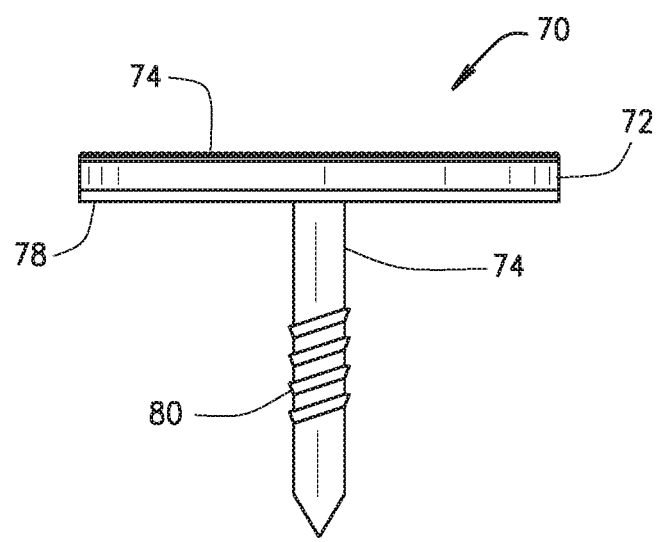
FIG. 8 is a side elevational view of the nail/disk structure illustrated in FIG. 7.
Figure 7A:
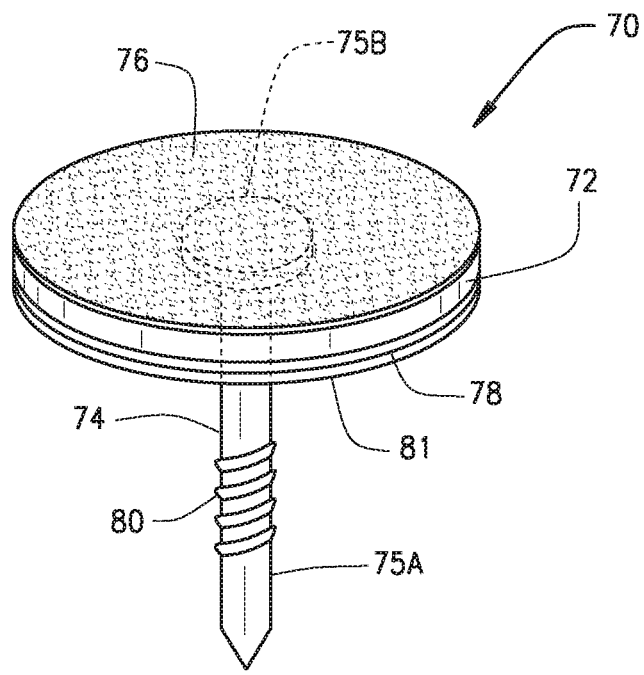
FIG. 7A is a perspective view similar to FIG. 7 showing the nail head incorporated into the body member of the nail/disk structure of FIG. 7.
Figure 8A:
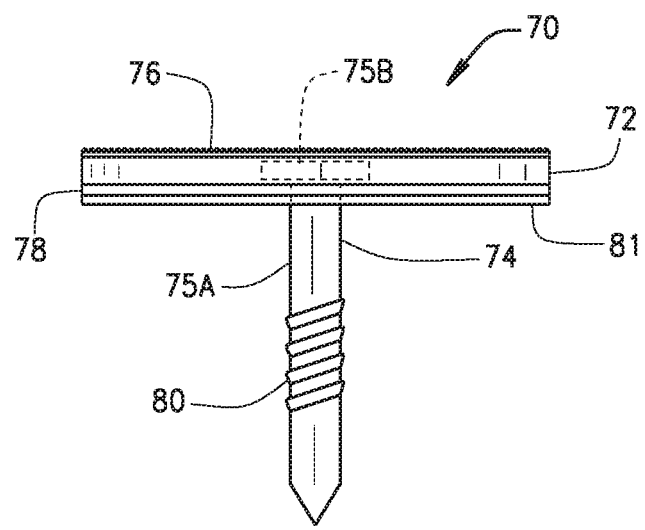
FIG. 8A is a side elevational view similar to FIG. 8 showing the nail head incorporated into the body member of the nail/disk structure of FIG. 8.

FIGS. 7 and 7A are perspective views of still another aspect of the present invention illustrating one embodiment 70 of a one-piece nail/disk structure for eliminating exposed nail heads associated with a typical asphalt shingled roof. FIGS. 8 and 8A illustrate side elevational views of the nail/disk structure 70 of FIGS. 7 and 7A and includes a color matching disk or body member 72 which is integrally formed with a roofing nail 74 such that both the disk 72 and the nail 74 are manufactured together. The body of the disk 72 can be made from an asphalt shingle and it can take on any shape including, but not limited to, a round shape, a rectangular shape, or a square shape. The disk 72 can also be made of a hail impact resistant shingle type material which can include a reinforcing layer (not shown), or any other suitable material. The top portion 76 of disk 72 includes colored granules embedded into its top surface so as to match the color scheme of the particular asphalt shingles being used for a particular application. In this regard, the disk 72 can be made from a different material other than asphalt and the color granules 76 can be applied and attached thereto in any conventional manner. In another embodiment, disk 72 and color granules 76 can be one unitary structure formed from a color matching asphalt shingle itself. Either way, the disk portion 72 is color coordinated to the asphalt shingles to which it will be applied.

Figure 8B:
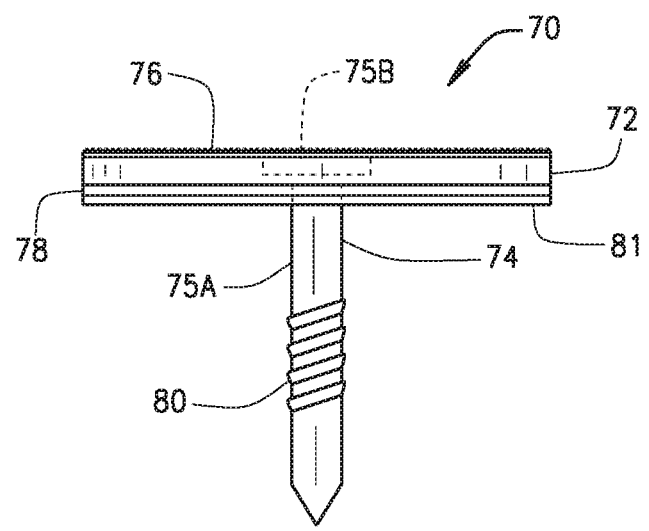
FIG. 8B is a side elevational view similar to FIG. 8A showing another embodiment of the nail head incorporated into the body member of the present nail/disk structure.
Figure 8C:
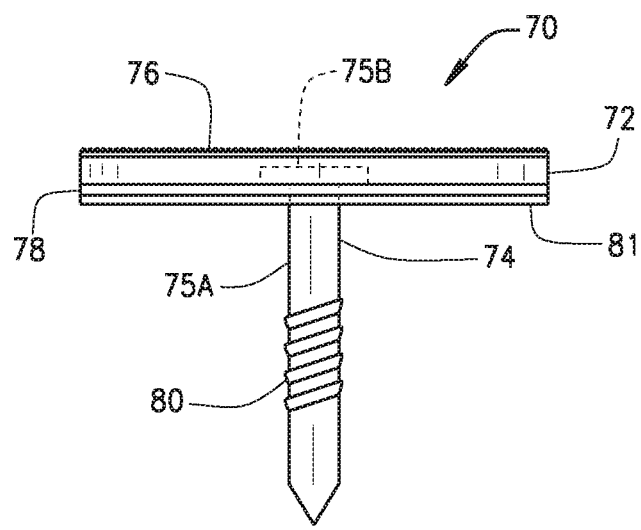
FIG. 8C is a side elevational view similar to FIGS. 8A and 8B showing still another embodiment of the nail head incorporated into the body member of the present nail disk structure.

More particularly, FIGS. 7A and 8A show the one-piece nail/disk structure 70 as well as the nail 74 which is incorporated or encapsulated into the body member 72. As clearly shown in FIGS. 7A and 8A, the nail 74 includes a body or shank portion 75A and a head portion 75B. As clearly illustrated in FIG. 8A, the head portion 75B of nail 74 is completely incorporated into or encapsulated within the body member 72 of the one-piece integral roof nail/disk structure 70 such that the head portion 75B of the nail 74 lies between the top and bottom surfaces of the body member 72. This is clearly shown in FIG. 8A. It is also recognized and anticipated that the nail head 75B can likewise lie equal to or flush with the top surface of the body member 72 such that it again lies within the body member 72 and extends below the top surface of the body member 72 as illustrated in FIG. 8B. In similar fashion, it is recognized and anticipated that the nail head 75B can likewise lie equal to or flush with the bottom surface of the body member 72 such that it again lies within the body member 72 and extends above the bottom surface of the body member 72 as illustrated in FIG. 8C. The nail/disk structure 70 is a one-piece integrally formed structure such that the nail 74 and the disk or body member 72 are one structure. The dotted outline of head portion 75B in FIGS. 7A, 8A, 8B and 8C illustrate the position and location of the nail head within the body member 72 when the nail 74 is incorporated or encapsulated into the disk or body member 72.

A sealant 78 can optionally cover the underside portion of disk 72 as best illustrated in FIGS. 8 and 8A thereby allowing the disk to permanently seal to the existing shingle when the present nail/disk structure 70 is nailed into an existing shingle. The sealant can be a heat activated sealant which is preferably activated by the sun although other heat sources can be used to bond the disk 72 to an existing shingle. Other adhesives can likewise be used in place of sealant 78. Regardless, the sealant 78 or other adhesive helps to prevent water from entering under the disk surface. The nail structure 74 may include a barbed structure 80 to further improve attachment to the existing shingle.

The present nail/disk structure 70 represents an improvement over the structures disclosed in Applicant's U.S. Pat. No. 9,206,835 as well as the other known structures disclosed in the prior art. The present structure 70 is a one-piece structure which can be used in all places where an exposed nail head would typically exist on a shingle roof. This could include use as the last course of nails on a typical shingled roof at the apex of the roof, at edges abutting dormers and chimneys, and at other places where an exposed nail head would occur. The present nail/disk structure 70 eliminates the need for caulking or using other sealants, adhesives or granules to cover exposed nail heads such as the exposed nail heads disclosed in U.S. Pat. No. 9,206,835, and its use saves time, money and improves the sealing capacity associated with exposed nails in a typical shingled roof. A roofing technician would carry a plurality of the nail/disk structures 70 along with typical roofing nails and would use the present structure 70 at all locations where the roofing nail will not be covered by another shingle. The present system and structure would be compatible with the life of new roof shingles; it will match the colors associated with a particular roof; and it eliminates exposed nail heads.

A cellophane tape or other release tape 81 can be placed over the sealant 78 so as to prevent the sealant from binding to any other material during shipment and storage. The roof technician would have to remove the release tape prior to nailing the present structure 70 into an asphalt shingle. The present one-piece structure 70 provides a water-proof roofing nail seal combination that prevents corrosion of nail heads due to exposure to the elements and also provides leak protection since the disk or body member 72 substantially overlays and overlaps the hole formed in the existing shingle through which the nail 74 is hammered. In addition, the sealant 78 likewise provides additional leak protection if used. If a sealant is used, the sealant causes the disk 72 to permanently seal to the existing shingle and further prevents water from entering under the disk 72. There are no exposed nail heads associated with the integral nail/disk member 70 since the nail head 75B is incorporated into or encapsulated within the disk or body member 72. Other advantages and features of the present nail/disk structure 70 will be apparent to those skilled in the art.

Understanding the scope of the present invention, the term "comprising" and its derivatives, as used herein, are intended to be open-ended terms that specify the presence of the stated features, elements, components and/or groups, but do not exclude the presence of other unstated features, elements, components and/or groups. The foregoing also applies to words having similar meanings such as the terms "including", "having" and their derivatives. The terms of degree such as "substantially", "about" and "approximate" as used herein mean a reasonable amount of deviation of the modified term such that the end result is not significantly changed.

Only selected embodiments have been chosen to illustrate the present inventions. The various constructions described above and illustrated in the drawings are presented by way of example only and are not intended to limit the concepts and principals of the present inventions. It is also recognized and anticipated that the size, shape, location and other orientation of the various components and/or elements associated with the present inventions can be changed as needed and/or as desired depending upon a particular application. Components that are shown directly connected or contacting each other can have intermediate structures disposed between them. In addition, the functions of one element can be performed by two elements, and vice versa. The structures and functions of one embodiment can also be adopted in another embodiment. It is not necessary for all advantages to be present in a particular embodiment at the same time. Thus, the foregoing descriptions of the embodiments according to the present inventions are provided for illustration only, and not for the purpose of limiting the inventions as defined by the appended claims and their equivalents.

Thus, there has been shown and described several embodiments of a novel shingle patch for damage repair of asphalt shingles as well as an integral nail/disk structure for eliminating exposed roofing nails. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

The invention claimed is:

1. A roofing nail structure comprising:
a body member having top and bottom surfaces;
a roofing nail having a head portion, the head portion of the roofing nail having top and bottom surfaces and being incorporated into said body member such that the top surface of the head portion of the roofing nail lies flush with the top surface of the body member; and
color granules associated with at least a portion of the top surface of said body member.

2. The roofing nail structure defined in claim 1 wherein said body member is made from an asphalt shingle.

3. The roofing nail structure defined in claim 1 wherein said body member is made from a hail impact resistant shingle type material.

4. The roofing nail structure defined in claim 1 wherein the shape of said body member is round.

5. The roofing nail structure defined in claim 1 including a sealant covering at least a portion of the bottom surface of said body member.

6. The roofing nail structure defined in claim 5 including release tape overlaying the sealant covering the bottom surface of said body member.

7. The roofing nail structure defined in claim 5 wherein said sealant is a heat activated sealant.

8. The roofing nail structure defined in claim 1 wherein said roofing nail includes a barbed portion.

9. A nail-disk structure comprising:
a disk having top and bottom surfaces;

a roofing nail having a head portion, the head portion of said roofing nail having top and bottom surfaces and being integrally formed with said disk such that the bottom surface of the head portion of the roofing nail lies flush with the bottom surface of the disk;

color granules associated with at least a portion of the top surface of said disk; and a sealant covering at least a portion of the bottom surface of said disk.

10. The nail-disk structure defined in claim 9 wherein said disk is made from an asphalt shingle.

11. The nail-disk structure defined in claim 9 including release tape overlaying the sealant covering the bottom surface of said disk.

12. The nail-disk structure defined in claim 9 wherein said sealant is a heat activated sealant.

\* \* \* \* \*